(12) United States Patent
Miyakawa et al.

(10) Patent No.: US 7,459,111 B2
(45) Date of Patent: Dec. 2, 2008

(54) MANUFACTURING METHOD OF SYNTHETIC RESIN CORE MATERIAL

(75) Inventors: Naohisa Miyakawa, Shiroi (JP); Katsuhisa Kato, Inzai (JP)

(73) Assignees: Tokiwa Chemical Industries Co., Ltd., Chiba (JP); System Technical Co., Ltd., Chiba (JP)

( * ) Notice: Subject to any disclaimer, the term of this patent is extended or adjusted under 35 U.S.C. 154(b) by 407 days.

(21) Appl. No.: 11/431,749

(22) Filed: May 11, 2006

(65) Prior Publication Data

US 2006/0267362 A1    Nov. 30, 2006

(30) Foreign Application Priority Data

May 24, 2005    (JP) ............... 2005-179863

(51) Int. Cl.
*B29C 47/08* (2006.01)

(52) U.S. Cl. .............. 264/145; 264/163; 425/306; 425/307; 425/308; 425/315

(58) Field of Classification Search ........... 264/145, 264/163, 142, 148, 150–151, 154, 156, 168, 264/678; 425/306, 307, 308, 315, 292–294, 425/298, 311, 313, 190, 515–516, DIG. 16; 49/490.1; 296/1.08, 146.9

See application file for complete search history.

(56) References Cited

U.S. PATENT DOCUMENTS

| | | | | | |
|---|---|---|---|---|---|
| 3,329,998 | A | * | 7/1967 | Stohr | 425/71 |
| 4,062,919 | A | * | 12/1977 | Rojahn et al. | 264/145 |
| 4,323,533 | A | * | 4/1982 | Bramhall | 264/145 |
| 4,392,654 | A | * | 7/1983 | Carella | 473/586 |
| 4,395,298 | A | * | 7/1983 | Wetzel et al. | 156/137 |
| 4,503,006 | A | * | 3/1985 | Kato | 264/148 |
| 4,842,794 | A | * | 6/1989 | Hovis et al. | 264/145 |
| 5,098,626 | A | * | 3/1992 | Pas | 264/151 |
| 5,302,466 | A | * | 4/1994 | Davis et al. | 428/573 |
| 5,306,455 | A | * | 4/1994 | Carroll | 264/145 |
| 5,582,670 | A | * | 12/1996 | Andersen et al. | 156/242 |
| 5,741,573 | A | * | 4/1998 | Malm | 428/83 |
| 5,752,345 | A | * | 5/1998 | Bright et al. | 49/490.1 |
| 5,783,312 | A | * | 7/1998 | Laughman et al. | 428/573 |
| 5,871,682 | A | * | 2/1999 | Kii et al. | 264/285 |
| 5,975,987 | A | * | 11/1999 | Hoopman et al. | 451/28 |
| 6,079,160 | A | * | 6/2000 | Bonds | 49/490.1 |
| 6,487,820 | B1 | * | 12/2002 | Nakajima et al. | 49/490.1 |
| 6,797,213 | B2 | * | 9/2004 | Bortone et al. | 264/143 |
| 7,135,216 | B2 | * | 11/2006 | Tsujiguchi | 428/122 |
| 7,257,924 | B2 | * | 8/2007 | Kounobu et al. | 49/490.1 |
| 7,318,613 | B2 | * | 1/2008 | Hiroe et al. | 296/1.08 |
| 2001/0042937 | A1 | * | 11/2001 | Rhodes | 264/145 |

(Continued)

*Primary Examiner*—Eric Hug
*Assistant Examiner*—Seyed Masoud Malekzadeh
(74) *Attorney, Agent, or Firm*—Wenderoth, Lind & Ponack, L.L.P.

(57) ABSTRACT

A method of manufacturing a synthetic resin core material having a substantially U-shaped cross section which is used in are extruded molding product for holding an opening portion of a vehicle body such as a door or a trunk of an automobile comprises the steps of extruding a synthetic resin to form a core material having a substantially U-shaped cross section, moving the U-shaped core material toward a cutting machine, rotating opposed rotors having blade-shaped portions in the cutting machine, and cutting and forming cut portions or cut slot portions on both lateral sides of the U-shaped core material.

9 Claims, 8 Drawing Sheets

U.S. PATENT DOCUMENTS

2003/0197298 A1* 10/2003 Hegishi et al. ............. 264/40.6
2003/0214068 A1* 11/2003 Fujisawa et al. ............ 264/145
2004/0081796 A1*  4/2004 Miyakawa et al. .......... 428/122
2004/0173931 A1*  9/2004 Chen et al. .................. 264/163
2004/0247720 A1* 12/2004 Peterson et al. ............. 425/114

* cited by examiner

MANUFACTURING METHOD OF SYNTHETIC RESIN CORE MATERIAL

BACKGROUND OF THE INVENTION

1. Field of the Invention

The present invention relates to a manufacturing method of a synthetic resin core material used in an extruded molding product such as a trim, a weather-strip or a window molding which is attached at a flange portion or the like of an opening portion in a vehicle body such as a door or a trunk of an automobile.

2. Description of the Related Art

In this type of extruded molding such as a trim, a weather-strip or a window molding used for holding a flange portion of an opening portion in a vehicle body such as a door or a trunk of an automobile, it is conventionally general to use a metallic core material in order to increase a holding force with respect to attachment of a vehicle body of an automobile As a manufacturing method of this metallic core material, cut slot portions having various shapes are punched out in a state where they have a tabular cross section, and then a synthetic resin or a material such as rubber is extruded to a tabular core material having each cut slot portion to form a covering layer on both sides of the tabular core material. Thereafter, the tabular core material is bent and manufactured into a shape having a substantially U-like cross section.

Since environment issues are increasing in recent years, changing a material of a core from a metal to a synthetic resin has been demanded in order to achieve a reduction in weight of the core material and recycling.

However, when the synthetic resin core material is manufactured from a flat plate like a metallic core material, there is a problem that bending the core material into a shape having a substantially U-like cross section is very difficult.

Further, cut slot portions having various shapes are formed by a press machine which operates in a vertical direction on a synthetic resin core material which has been extruded into a shape having a substantially U-like cross section in advance, but a speed of the press machine which operates in the vertical direction is slow, and hence there is a problem of poor manufacturing efficiency.

Therefore, it is mechanically very complicated and takes labors and time in a prior art to form a cut portion or a cut slot portion on opposed lateral sides of a U-shaped core material in order to readily bend in a three-dimensional direction a core material having a substantially U-like cross section consisting of a hard synthetic resin.

SUMMARY OF THE INVENTION

It is an object of the present invention to provide a manufacturing method of a synthetic resin core material which cut portions or cut slot portions can be assuredly and rapidly formed on lateral sides of the U-shaped core material at fixed or non-fixed intervals so that these portions face each other or staggered, by traveling a synthetic resin core material having a substantially U-like cross section between opposed supports of a cutting machine and rotating opposed rotors each having a blade-shaped portion mounted on the supports.

A manufacturing method of a synthetic resin core material according to the present invention comprises the steps of extruding a synthetic resin by an extruder to form a core material having a substantially U-shaped cross section, carrying the U-shaped core material toward a cutting machine which includes opposed supports and rotors each having a blade-shaped portion disposed oppositely or alternately on the supports, rotating the rotors together with the blade-like portions with respect to the U-shaped core material traveling toward a space between the supports, and forming cut portions or cut slot portions in the U-shaped core material at opposed positions or staggered positions in fixed or non-fixed intervals.

Furthermore, it comprises a hollow metal mold disposed between the respective rotors, and the blade-shaped portions are rotated together with the rotors, at cutting grooves formed in the hollow metal mold, or after the U-shaped core material has passed through the inside of the hollow metal mold, whereby the cut portions or cut slot portions are formed in the U-shaped core material at opposed positions or staggered positions in fixed or non-fixed intervals.

According to the present invention, the synthetic core material is extruded into a shape having a substantially U-like cross section and cut portions or cut slot portions are formed, as different from conventional processing of a tabular core material made of a synthetic resin. Therefore, troublesome means for processing a cross section into a U shape is no longer necessary. Since the synthetic resin core material is used, a weight is reduced as compared with a metallic core material, and it is thereby possible to cope with recycling. A thickness of each of a head portion and lateral sides of the U-shaped core material can be freely selected by extrusion of the synthetic resin as required.

When the rotors having the opposed blade-shaped portions are rotated, the cut portions can be rapidly formed as compared with a case where a press machine which operates in a vertical direction is used. Just replacing the blade-shaped portion of each rotor can readily change a width of each cut portion or each cut slot portion to a narrow width or a wide width. Varying a rotation speed of the opposed rotors can form the cut portions or the like at fixed or non-fixed intervals. Shifting a timing of rotation of the opposed rotors can form cut portions or the like at opposed or staggered positions.

Moreover, when the rotors are set at staggered positions, the U-shaped core material can be cut to a central part of the head portion without collision of the opposed blade-shaped portions during rotation. Additionally, since the hollow metal mold is provided between the rotors, the vibration at cutting time of rotors is kept few and the U-shaped core material is supported in a stable shape after or during transmission of the U-shaped core material through the inside of the hollow metal mold, so that the cut portions or cut slot portions can be readily, assuredly and rapidly formed.

DESCRIPTION OF THE PREFERRED EMBODIMENTS

Figure 1:
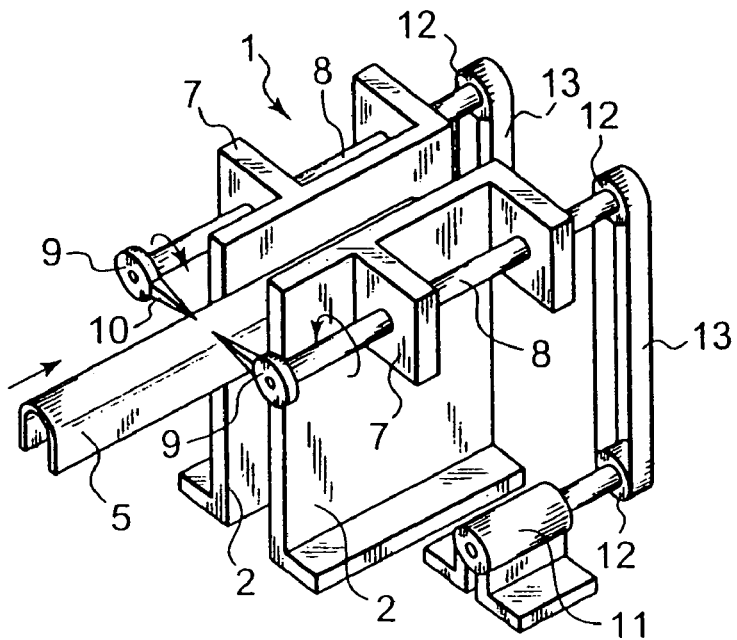
FIG. 1 is a perspective view of a cutting machine used in the present invention.
Figure 2:
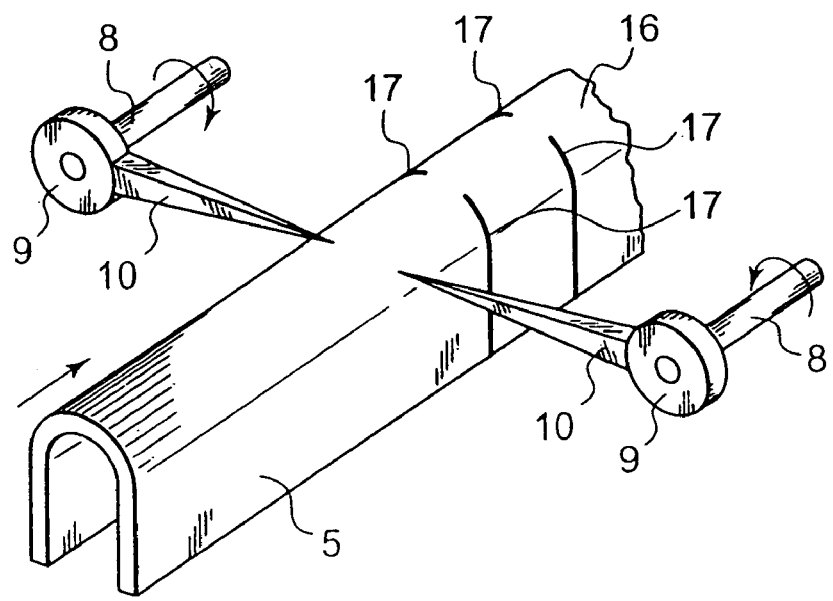
FIG. 2 is a perspective view of a cutting state in which a U-shaped core material according to the present invention passes through rotating rotors of the cutting machine.
Figure 4:
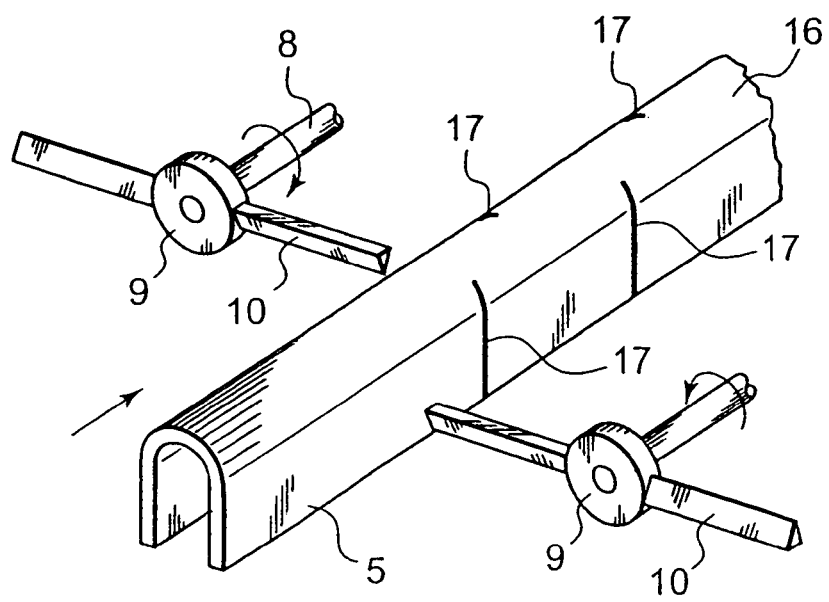
FIG. 4 is a perspective view of a cutting state in which the U-shaped core material according to the present invention passes through rotating staggered rotors.
Figure 10:
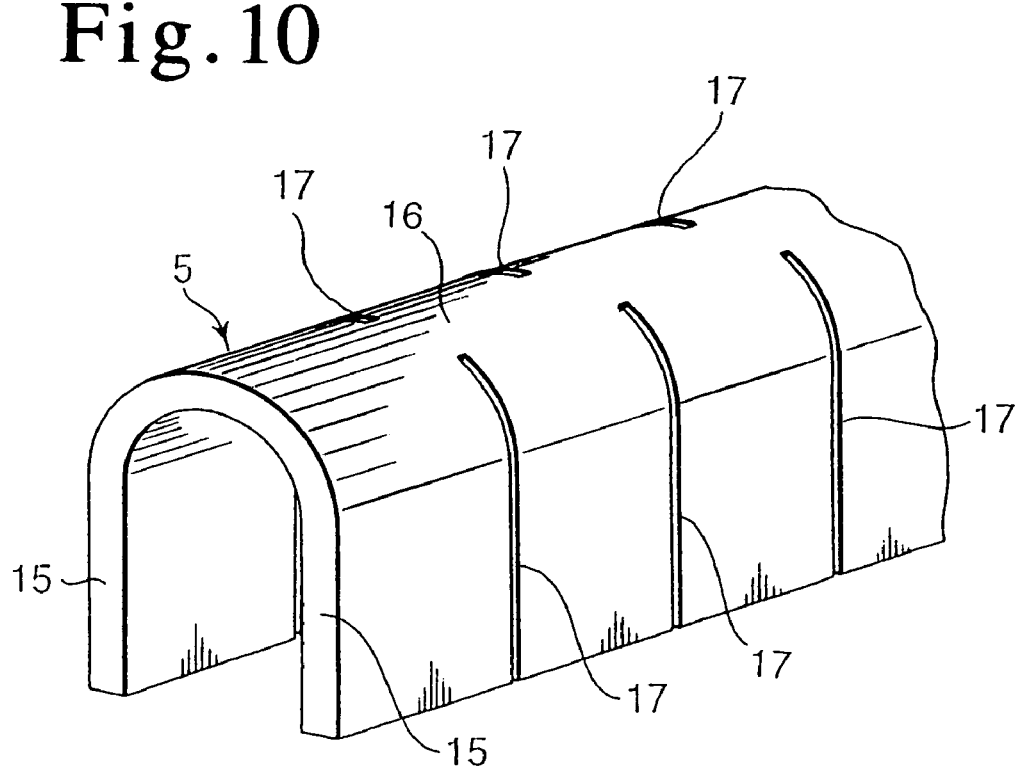
FIG. 10 is a perspective view showing a state where opposed cut portions are formed on lateral sides of the U-shaped core material according to the present invention.
Figure 11:
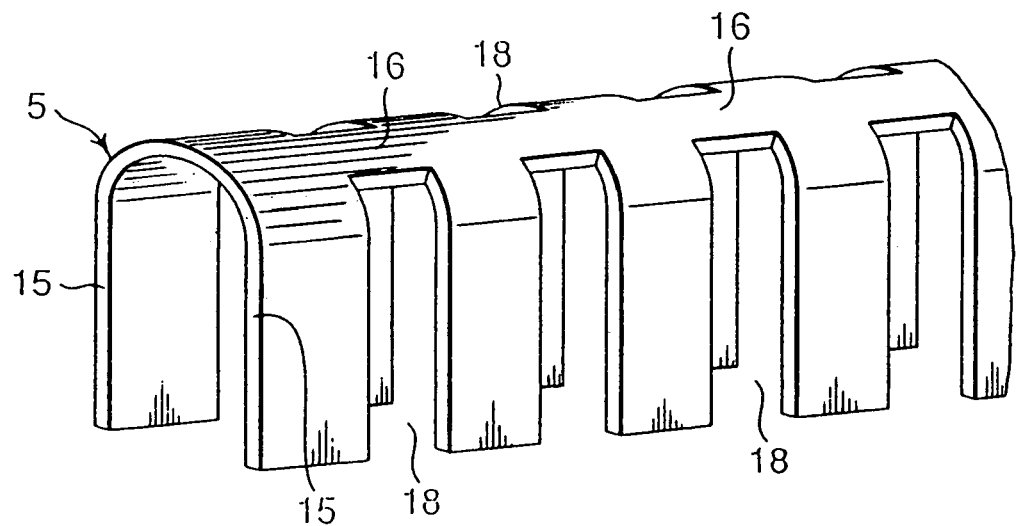
FIG. 11 is a perspective view showing a state where opposed cut slot portions are formed on lateral sides of the U-shaped core material according to the present invention.
Figure 12:
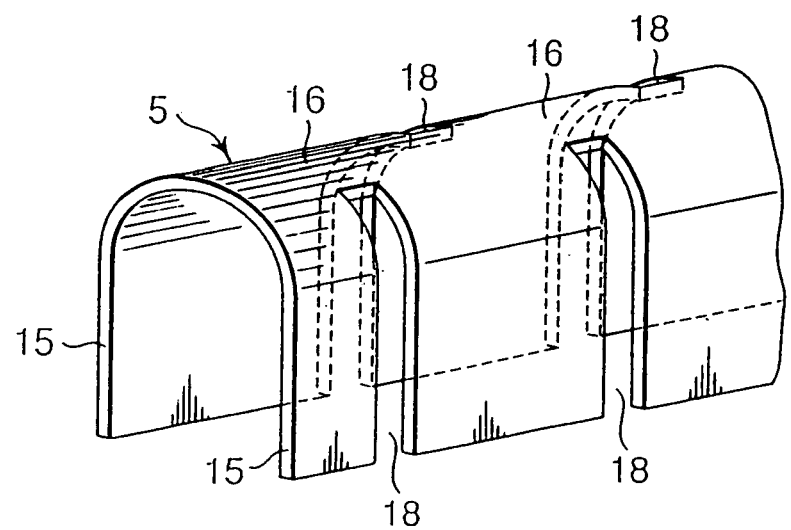
FIG. 12 is a perspective view showing a state where staggered cut slot portions are formed on lateral sides of the U-shaped core material according to the present invention.
Figure 14:
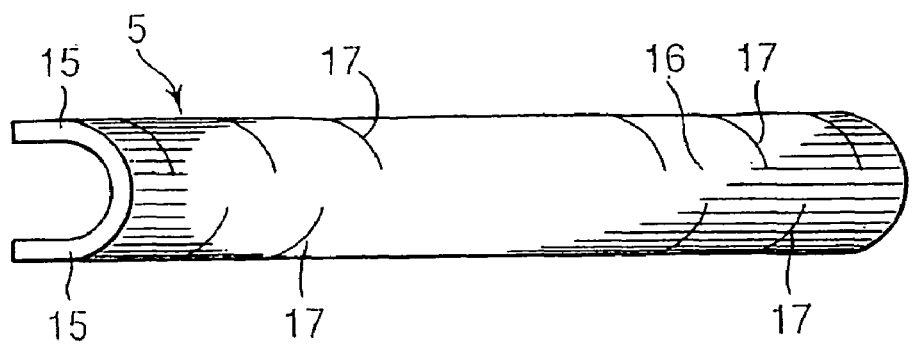
FIG. 14 is a plane view showing a state where staggered cut portions of the U-shaped core material according to the present invention are formed at non-fixed intervals.

In an illustrated embodiment according to the present invention, a core material 5 having a substantially U-shaped cross section is formed by extruding a synthetic resin by using an extruder, and the U-shaped core material 5 is carried toward a space between opposed supports 2 and 2 as shown in FIG. 1. The supports 2 and 2 are provided with rotors 9 and 9 mounted to rotary shafts 8 and 8, and the rotors 9 and 9 have blade-like portions 10 and 10 which are used to cut the U-shaped core material 5 as shown in FIGS. 2 and 4. By rotating the blade-like portions 10 and 10 together with the rotators, cut portions 17 or cut slot portions 18 are oppositely formed at fixed intervals as shown in FIGS. 10 and 11, or alternately formed at fixed intervals as shown in FIGS. 4 and 12, or the cut portions 17 are formed at non-fixed intervals as shown in FIG. 14.

Figure 5:
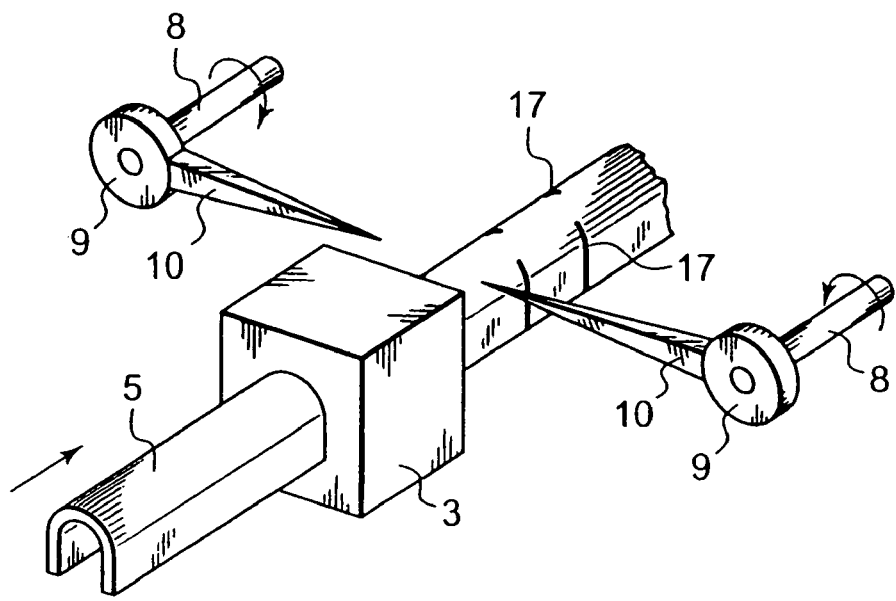
FIG. 5 is a perspective view of a cutting state after the U-shaped core material according to the present invention passes through a hollow metal mold.
Figure 6:
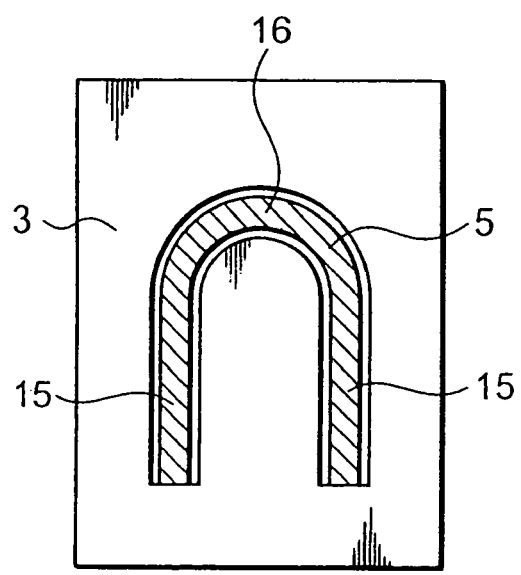
FIG. 6 is a cross-sectional view of the U-shaped core material in the hollow metal mold according to the present invention.
Figure 7:
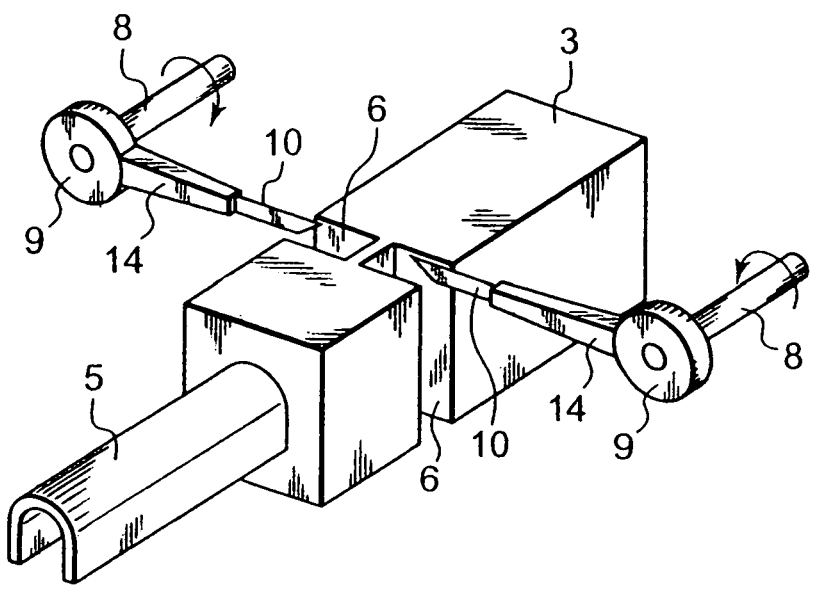
FIG. 7 is a perspective view of a cutting state in which the U-shaped core material according to the present invention is cut by rotors in cutting grooves formed in the hollow metal mold.
Figure 8:
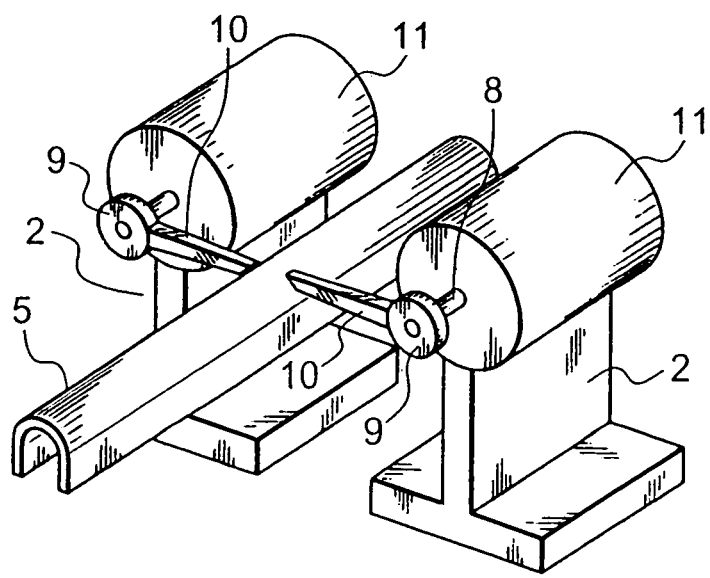
FIG. 8 is a perspective view showing another embodiment of a cutting machine used in the present invention.

Further, a hollow metal mold 3 is disposed between the opposed rotors 9 and 9 as shown in FIG. 5, the U-shaped core material 5 is supported in a stable state by using the hollow metal mold 3, and the cut portions 17 or the cut slot portions 18 are formed by the blade-shaped portion 10 of each rotating rotor 9 after the passing of the U-shaped core material 5 through the inside of the hollow metal mold 3 as shown in FIGS. 6 and 7 or during the passing of the same through the inside of the hollow metal mold 3 as shown in FIG. 8.

Figure 15:
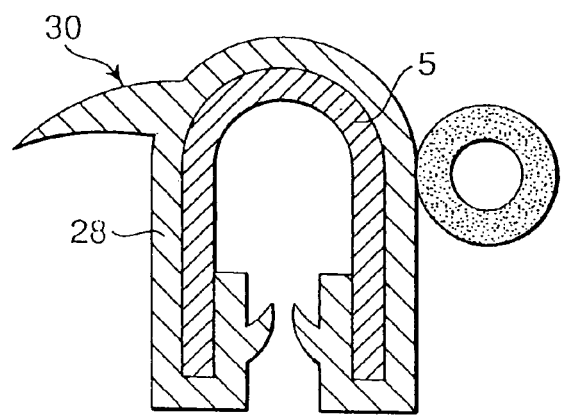
FIG. 15 is a cross-sectional view of an extruded molding product in which a synthetic resin core material according to the present invention is used.

A covering layer 28 made of a soft synthetic resin is melting adhered as shown in FIG. 15 on the U-shaped core material 5 subjected to cutting processing as described above in a manufacturing process shown in FIG. 16, and the obtained core material 5 is used to be held in a flange of various kinds of opening portions such as a door, a trunk or the like of an automobile as an extruded molding product 30.

Figure 3:
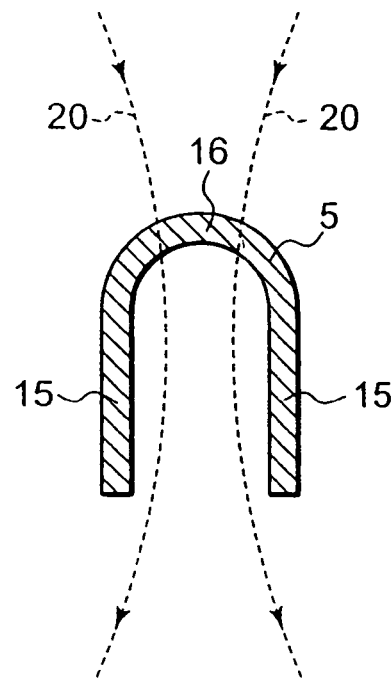
FIG. 3 is a vertical sectional view showing a rotating direction along which the U-shaped core material according to the present invention is cut.

FIG. 1 shows a cutting machine 1, and the opposed supports 2 and 2 are attached to an upper portion of a base frame (not shown) of the cutting machine 1. The supports 2 and 2 are provided with respective bearing portions 7 and 7 to which the rotary shafts 8 and 8 are respectively rotatably mounted. The rotors 9 and 9 having the blade-shaped portions 10 and 10 are attached to one end of each of the rotary shafts 8 and 8 as shown in FIGS. 1 and 2. The blade-shaped portions 10 and 10 cut both lateral sides 15 and 15 from a head portion 16 of the U-shaped core material 5 along rotation directions 20 and 20 as shown in FIG. 3, and form such cut portions 17 and 17 and cut slot portions 18 and 18 as shown in FIGS. 10, 11, 12 and 14. The rotation directions 20 and 20 can be also set to rotation directions reversed from the illustrated directions.

Rotating rollers 12 and 12 are mounted to the other ends of the rotary shafts 8 and 8, rotating rollers 12 and 12 are mounted to rotary shafts of power motors 11 and 11, and a transmission belt 13 is wound around said rotating rollers 12 and 12 of the rotary shafts 8 and 8 and rotating rollers 12 and 12 of the power motors 11 and 11. The rotating rollers 12 and 12 of the rotary shafts 8 and 8 are connected to the rotating rollers 12 and 12 of the power motors 11 and 11 through the transmission belt 13 to transmit driving forces of the power motors 11 and 11 to the rotary shafts 8 and 8 through the transmission belt 13, thereby rotating the rotors 9 and 9 having the blade-shaped portions 10 and 10. FIG. 8 shows another embodiment of the cutting machine 1 in which each rotor 9 having a blade-shaped portion 10 is directly connected with the rotary shaft 8 of each power motor 11.

FIG. 4 shows an embodiment according to claim 2 in a state where rotors 9 and 9 having blade-shaped portions 10 and 10 are oppositely disposed in staggered positions. Each of the rotors 9 and 9 can be also provided with a plurality of blade-shaped portions 10 and 10.

FIG. 5 shows an embodiment according to claim 3 in a state where a hollow metal mold 3 is disposed between respective rotors 9 and 9 in a cutting machine 1, a U-shaped core material 5 is supported in a stable state by the hollow metal mold 3, and the blade-shaped portions 10 and 10 of the rotating rotors 9 and 9 are used to cut and form cut portions 17 or cut slot portions 18 in the U-shaped core material 5 after the passing of the U-shaped core material 5 through the inside of the hollow metal mold 3 as shown in FIG. 6.

FIG. 7 shows an embodiment according to claim 4 in a state where a U-shaped core material 3 is supported in a hollow metal mold 3, and blade-shaped portions 10 and 10 of rotating rotors 9 and 9 are used to form cut portions 17 or cut slot portions 18 at the positions of cutting grooves 6 and 6 formed in the hollow metal mold 3 during the passing of the U-shaped core material 5 through the inside of the hollow metal mold 3. Blade receiving portions 14 and 14 are interposed between the rotors 9 and 9 and the blade-shaped portions 10 and 10.

Figure 9:
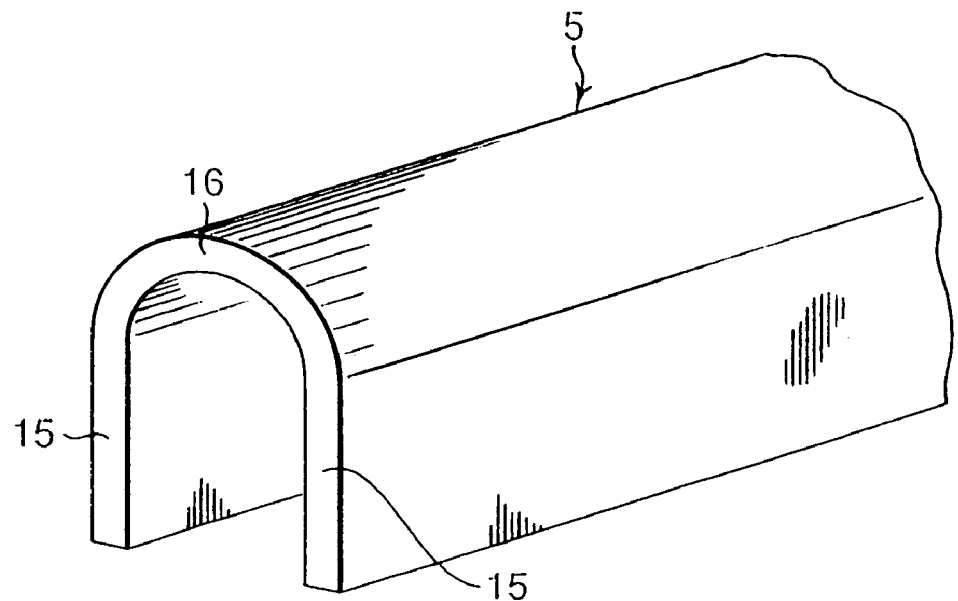
FIG. 9 is a perspective view of a U-shaped core material according to the present invention.

FIG. 9 shows an extruded synthetic resin core material 5 having a substantially U-shaped cross section, and the U-shaped core material 5 includes a head portion 16 at an upper part and lateral sides 15 and 15 on both sides. Since the U-shaped core material 5 is formed by extruding a synthetic resin, a thickness of each of the head portion 16 and the lateral sides 15 and 15 of the U-shaped core material 5 can be freely adjusted as required.

Figure 13:
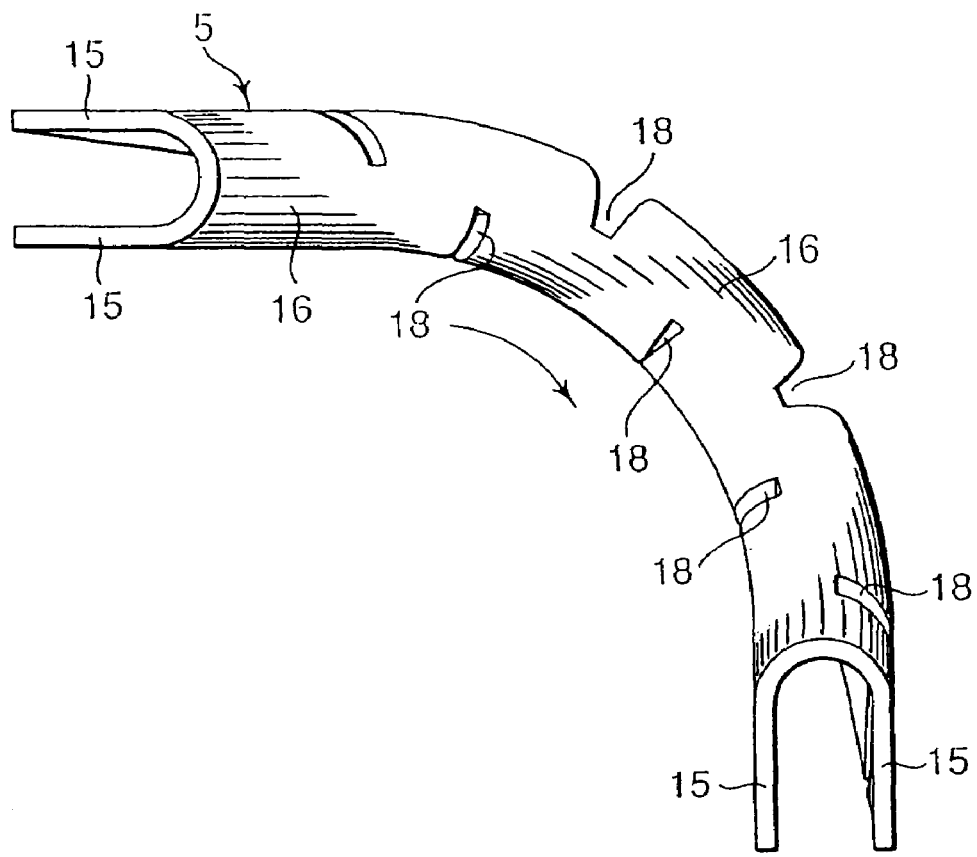
FIG. 13 is a perspective view showing a state where the U-shaped core material according to the present invention is bent.

FIG. 10 shows a state where the cut portions 17 and 17 are continuously formed at the opposed positions on the lateral sides 15 and 15 of the U-shaped core material 5 in the fixed intervals, FIG. 11 shows a state where cut slot portions 18 and 18 are continuously formed at the opposed positions in the fixed intervals, and FIG. 12 shows a state where cut slot portions 18 and 18 are continuously formed at the staggered positions on a U-shaped core material 5 in the fixed intervals. FIG. 13 shows a state where a U-shaped core material 5 can be three-dimensionally and freely bent. Furthermore, FIG. 14 shows a state where staggered cut portions 17 and 17 are formed in a U-shaped core material 5 at the non-fixed intervals.

FIG. 15 shows an embodiment of an extruded molding product 30 having covering layers 28 and 28 melting adhered on an outer periphery of a U-shaped core material 5, and the extruded molding product 30 having the U-shaped core material 5 is used for a flange of an opening portion of an automobile.

Figure 16:
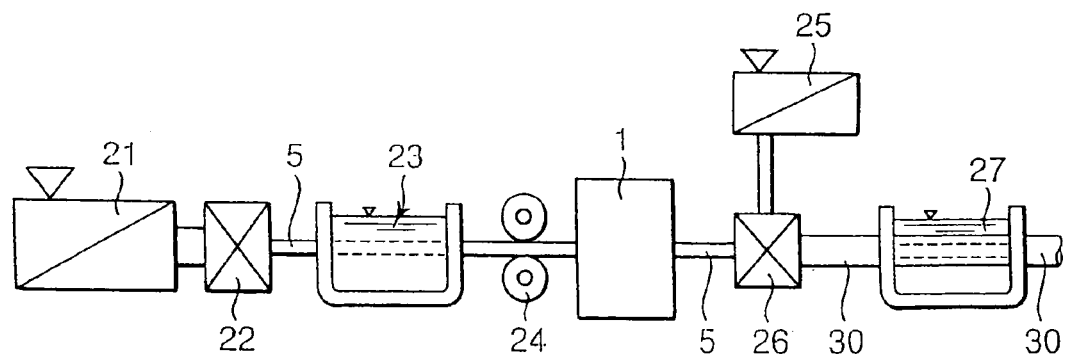
FIG. 16 is a side view showing a manufacturing process of an extruded molding product in which a synthetic resin core material according to the present invention is used.

FIG. 16 shows a process of manufacturing an extruded molding product 30, in which an extruder which manufactures a U-shaped core material 5 according to the present invention is connected with a cutting machine. A manufacturing method of the synthetic resin core material according to the present invention will now be described with reference to FIG. 16. The core material 5 having a substantially U-shaped cross section is extruded in a first mold die 22 by a first extruder 21 in which a hard synthetic resin is filled, and the extruded U-shaped core material 5 passes through a first cooling water tank 23, and advances toward a cutting machine 1 by feed rollers 24. Then, in the cutting machine 1, the rotors 9 having blade-shaped portions 10 are rotated, and the cut portions 17 and 17 or cut slot portions 18 and 18 having various shapes are formed by the cutting machine 1 in the U-shaped core material 5. Thereafter, a covering layer 28 having a desired shape is melting adhered on the U-shaped core material 5 having the cut portions 17 or the cut concave portions 18 in a second mold die 26 by using a second extruder 25 in which a soft synthetic resin is filled, thereby forming an extruded molding product 30. The extruded molding product 30 is cooled in a second cooling water tank 27 and cut to have a desired length.

Next, a material used for the U-shaped core material according to the present invention will be now described in details. As a hard synthetic rein for forming the core material 5 having a substantially U-shaped cross section, there is used an olefinic system resin such as polypropylene or polyethylene, a styrene system resin, a nylon system resin, a polyester system resin, a polycarbonate system resin or a mixed synthetic resin obtained by mixing fine particles of talc, mica or glass fibers in such a hard synthetic resin as described above, thereby increasing rigidity and reducing a linear expansion coefficient. In an example where fine particles of talc are mixed in polypropylene, it is possible to reduce a linear expansion coefficient of polypropylene which is approximately $1.4 \times 10^{-4}$ (mm/mm·° C.) to approximately 30 to 70%, when 20 to 40 weight % of talc fine particles is mixed. Moreover, as a soft synthetic resin for forming the covering layer 28, there is used a soft synthetic resin such as olefinic thermoplastic elastomer or styrene system thermoplastic elastomer having hardness of HDA90 (JIS K7215) or below.

What is claimed is:

1. A manufacturing method of a synthetic resin core material comprising the steps of: extruding a synthetic resin by an extruder to form a core material having a substantially U-shaped cross section; advancing the U-shaped core material toward a cutting machine which includes opposed supports and rotors having blade-shaped portions disposed oppositely on the supports; rotating the rotors together with the blade-shaped portions with respect to the U-shaped core material traveling between the opposed supports; and cutting and forming opposed cut portions or cut slot portions in the U-shaped core material at fixed intervals.

2. The manufacturing method of a synthetic resin core material according to claim 1, wherein the rotors having the blade-shaped portions are disposed at staggered positions to cut and form the cut portions or the cut slot portions in the U-shaped core material in a staggered pattern at the fixed intervals.

3. The manufacturing method of a synthetic resin core material according to claim 1, wherein a hollow metal mold is arranged between the rotors, and the blade-shaped portions are rotated together with the rotors after passing of the U-shaped core material through the inside of the hollow metal mold, thereby cutting and forming the cut portions or the cut slot portions on both lateral sides of the U-shaped core material.

4. The manufacturing method of a synthetic resin core material according to claim 3, wherein cutting grooves are provided in the hollow metal mold, and the blade-shaped portions together with the rotors are rotated through the cutting grooves during passing of the U-shaped core material through the inside of the hollow metal mold, thereby cutting and forming the cut portions or the cut slot portions in the U-shaped core material.

5. The manufacturing method of a synthetic resin core material according to claim 1, wherein the cut portions or the cut slot portions are cut and formed in the U-shaped core material at non-fixed intervals.

6. The manufacturing method of a synthetic resin core material according to claim 2, wherein a hollow metal mold is arranged between the rotors, and the blade-shaped portions are rotated together with the rotors after passing of the U-shaped core material through the inside of the hollow metal mold, thereby cutting and forming the cut portions of the cut slot portions on both lateral sides of the U-shaped core material.

7. The manufacturing method of a synthetic resin core material according to claim 2, wherein the cut portions or the cut slot portions are cut and formed in the U-shaped core material At non-fixed intervals.

8. The manufacturing method of a synthetic resin core material according to claim 3, wherein the cut portions of the cut slot portions are cut and formed in the U-shaped core material at non-fixed intervals.

9. The manufacturing method of a synthetic resin core material according to claim 4, wherein the cut portions of the cut slot portions are cut and formed in the U-shaped core material At non-fixed intervals.

* * * * *